United States Patent Office 3,063,927
Patented Nov. 13, 1962

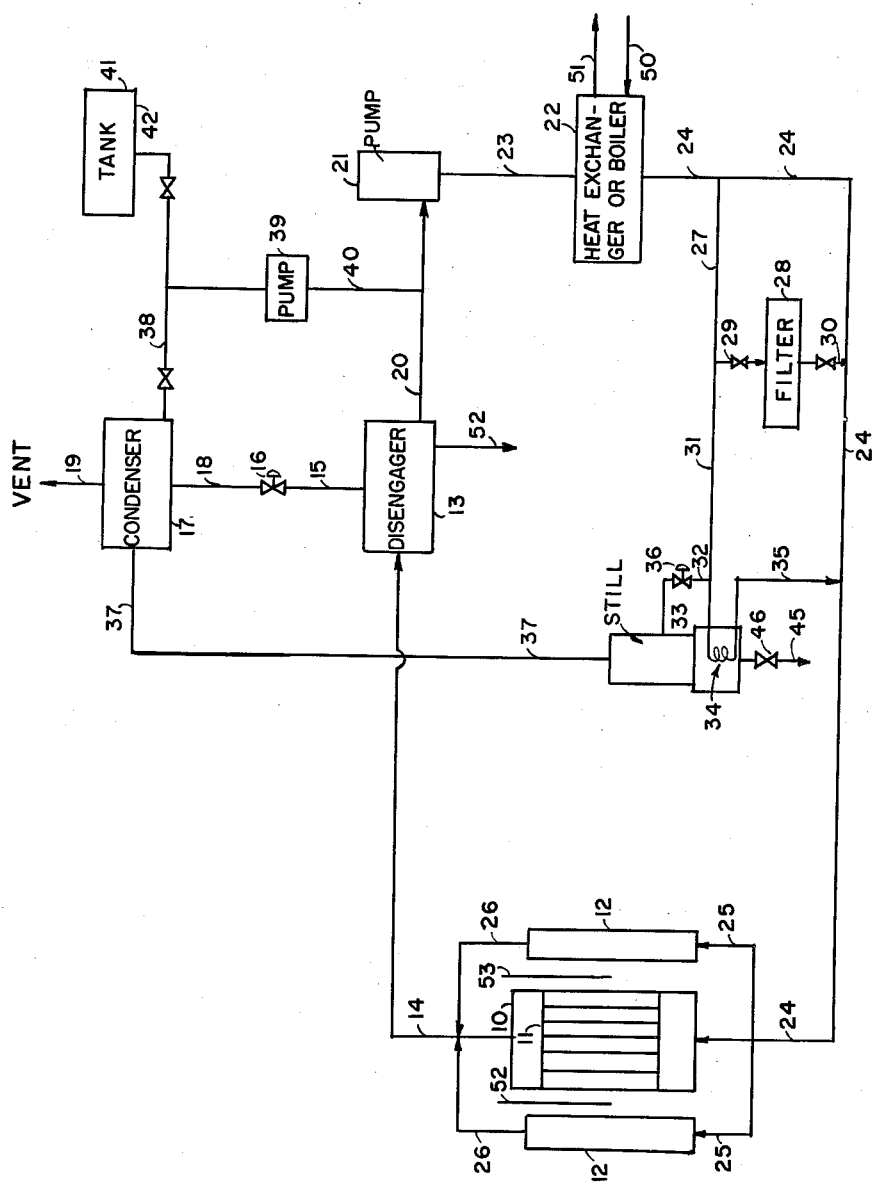

3,063,927
STABILIZATION OF ORGANIC COOLANTS AND MODERATORS IN NEUTRONIC REACTORS
Morris R. Ort and William H. Yanko, Dayton, Ohio, assignors to Monsanto Chemical Company, St. Louis, Mo., a corporation of Delaware
Filed Mar. 6, 1959, Ser. No. 798,318
12 Claims. (Cl. 204—193.2)

This invention deals with improvements in the art of cooling and moderating a neutronic reactor and in particular deals with the utilization of new compositions especially suitable for heat extraction from and moderating purposes within a neutronic power reactor.

It has been known for some time that the isotope U–235, occurring in natural uranium to the extent of one part in 139 parts of natural uranium could be fissioned by bombardment with thermal neutrons, resulting in the production of two lighter elements having great kinetic energy, together with approximately two fast neutrons on the average together with beta and gamma radiation. Vast amounts of heat energy are liberated in this reaction, and the recovery and use of such heat has presented attractive possibilities as a use of nuclear power.

The practical generation and recovery of the "nuclear or atomic" derived heat was, of course, dependent upon the successful solution of the problem of safely inducing and controlling a self-sustaining chain reaction. As is well known to those skilled in this art, this problem was solved by arranging bodies of the fissionable material, usually uranium or enriched uranium, in a geometric pattern within a mass of moderator in such fashion that a self-sustaining controllable chain reaction was obtained. The considerable amounts of heat generated in the bodies of fissionable material were removed either by cooling these bodies with a gas or with a suitable liquid. As a result there were developed two general types of neutronic reactors which came to be referred to as "gas-cooled" and "liquid-cooled" reactors.

For the purpose of recovering the heat liberated by the fissioned chain reaction and utilizing such heat in a heat engine of conventional type, the liquid-cooled reactor has received the greatest attention and it is with this type of reactor that this invention is concerned.

Methods for constructing and operating neutronic reactors for carrying out the chain reaction are well known in this art and are described, for example, by Fermi and Szilard in U.S. Patent No. 2,708,656, issued May 17 1955. The descriptive matter of this patent is by reference incorporated herein and made a part of this disclosure. According to the disclosure of this patent, either light water, $H_2O$, heavy water, $D_2O$, or diphenyl (biphenyl) may be used as a moderator and coolant in the liquid-cooled reactor.

Attractive possibilities are presented by the use of biphenyl as a reactor coolant. The properties of this material, i.e., its relatively high boiling point at atmospheric pressure (255° C.), its chemical composition consisting only of carbon and hydrogen, and its thermal stability make possible the operation of reactors cooled with this material at temperatures as high as 425° C., or higher, for extended periods of time. A major drawback encountered in the use of this material lies in its relatively high freezing (70° C.) or pour point, relatively low boiling point (255° C.), and the fact that some polymerization takes place in the biphenyl as a result of radiolytic damage.

In copending application Serial No. 590,002, filed June 7, 1956, now U.S. 2,902,425 low pour point reactor coolants and moderators are described which are monoisopropylbiphenyls or mixtures of mono-isopropylbiphenyls with biphenyl employing not in excess of 20% by weight of biphenyl in the mixture.

Copending application Serial No. 727,999 filed April 11, 1958, now abandoned, describes reactor coolants and moderators which have advantages over both biphenyl and monoisopropylbiphenyl. These materials are lower alkyl-o-terphenyls and lower alkyl-m-terphenyls or mixtures thereof. Not more than about 50% by weight of lower alkyl-p-terphenyls can be tolerated in admixture with the other isomers and still have sufficiently low pour point.

The surprising discovery has now been made that free sulfur acts as a stabilizer for the polyphenyls inhibiting the formation of residues from polyphenyls subjected to radiation, such as alpha, beta, and gamma rays, neutrons, etc. The term "polyphenyl" is defined for the purposes of this application to include biphenyl, the terphenyls, alkylation products thereof wherein one or two lower alkyl groups and only minor amounts of three or more lower alkyl groups are added, and mixtures thereof. At least a sufficient amount of free sulfur is used to reduce residue formation in polyphenyls subjected to radiation. Excessive amounts of free sulfur may be undesirable and not more than about 30 mol percent, preferably not more than 25 mol percent, based on the polyphenyl or polyphenyl mixture should be used, and normally it is preferred to use an amount in the range of from about 1 to 15 mol percent.

It is an object of this invention to provide new and useful neutronic reactor moderators and/or coolants stabilized against residue formations due to radiation.

It is another object of this invention to provide new compositions of matter having improved stability against residue formation when used as neutronic reactor moderators and coolants.

It is a further object of the invention to provide new compositions stabilized against radiation decomposition resulting in the formation of residue products.

These and other objects of the invention will become apparent as the detailed description of the invention proceeds.

An illustrative but non-limiting listing of polyphenyls stabilized by sulfur against residue formation from radiation and which are useful neutronic reactor moderators and coolants are the following: bi-penyl, o-terphenyl, m-terphenyl, p-terphenyl, methylbiphenyl, dimethylbiphenyl, ethylbiphenyl, n-propylbiphenyl, isopropylbiphenyl, di-isopropylbiphenyl, n-butylbiphenyl, isobutylbiphenyl, diisobutylbiphenyl, t-butylbiphenyl, di-t-butylbiphenyl, amylbiphenyl, hexylbiphenyl, methyl-o-terphenyl, di-ethyl-m-terphenyl, n-propyl-p-terphenyl, isopropyl-o-terphenyl, isopropyl - m - terphenyl, isopropyl-p-terphenyl, diisopropyl-o-terphenyl, diisopropyl-m-terphenyl, diisopropyl-p-terphenyl, n-butyl-o-terphenyl, isobutyl-o-terphenyl, isobutyl - m - terphenyl, diisobutyl-p-terphenyl, t-butyl-o-terphenyl, t-butyl - m - terphenyl, t-butyl-p-terphenyl, di-t-butyl - o - terphenyl, di-t-butyl-m-terphenyl, di-t-butyl-p-terphenyl, n-amyl - o - terphenyl, n-hexyl-m-terphenyl, etc. The position of the lower alkyl group or groups on polyphenyl rings is not critical and so has not been designated in the named compounds above.

Of the compounds named specifically above biphenyl or the terphenyls are desirable in being the least expensive and they are usable in spite of their high pour points, although they tend to cause trouble in use with freezing up of lines particularly during temporary shutdowns. Mixtures of the terphenyl isomers available commercially under the name of "Santowax R," are quite satisfactory. To obtain coolants and modifiers having low pour point characteristics biphenyl, a terphenyl, or mixed terphenyl isomers are alkylated to preferably add one or two isopropyl or t-butyl groups. Especially desirable as coalants and moderators are mixtures of mono- and di-t-butylated o-, m- and p-terphenyl isomers having not more than about 50% by weight of t-butylated p-terphenyl isomers, which has a relatively high pour point as compared to the o- and m- isomers. "Santowax R" is a suitable raw material source to alkylate in preparing said isobutylated mixture.

As neutronic reactor moderators and/or coolants the polyphenyls named in the paragraph immediately above can be used either singly or in admixture with others. The alkylated biphenyls and terphenyls can be made by methods which are illustrated in copending application, Serial No. 727,999, filed April 11, 1958. To make methyl alkylated polyphenyl it is desirable in the alkylation process to operate under pressure since methyl bromide is a gas at room temperature. Normally under proper operating conditions, alkylation will result in a mixture which will be primarily monoalkyl and dialkyl polyphenyls, although minor amounts of tri- and higher polyalkylated products will be formed. In the polyalkylpolyphenyls the reactive positions of the alkyl groups is not critical, and the alkylation products can be used as is for reactor coolants and moderators with the added free sulfur stabilizer of course; however, it may be preferred to use distillation to separate out the desired mono- and dialkyl portions. The alkylation process, of course, will result normally in a mixture of isomers wherein the alkyl groups are located in ortho, meta and para positions on the polyphenyl nucleus. The single isomer could be used as neutronic reactor coolants and moderators but actually it is preferred to use the mixed isomer.

To test the radiation stability of the free sulfur stabilized polyphenyls of the invention representative samples of biphenyl, biphenyl plus sulfur, and biphenyl plus a sulfur containing compound were irradiated with high energy electrons using a Van de Graaff generator as the source of radiation.

A typical experiment is illustrated in a biphenyl control run as follows: 60 grams (0.39 mol) of biphenyl was melted and charged to a stainless steel reactor closed at both ends and provided with a thin titanium window lengthwise of the reactor to admit the radiation. Suitable inlet and outlet ports with valving were provided for the reactor. After the sample was added to the reactor the reactor was flushed with nitrogen, then connected to a gas collecting bottle. The biphenyl was irradiated with the Van de Graaff electron source at 2 million electron volts (m.e.v.) and 250 microamperes ($\mu$a). The sample was subjected to periodic irradiation with a visual checking of the reactor and sample between irradiations. The reactor was water cooled to keep the sample temperature down below about 110° C. and prevent substantial thermal decomposition. Total time of irradiation was 2 hours and 24 minutes giving a total power input to the biphenyl sample of 1200 watt-hours or 20 watt-hours per gram of biphenyl. A total of 58 grams of material were recovered from the reactor, no special attempt being made to obtain good product recovery. The viscosity of the biphenyl before irradiation was 0.9778 centistokes (c.s.) and after irradiation 1.376 c.s. at 100° C.

To determine the residue formation in the irradiated samples distillations were made of representative aliquots of the biphenyl before and after irradiation. Conditions of distillation were adjusted so only biphenyls would be distilled leaving the higher boiling polyphenyls as residue. A cylindrical aluminum block having a concentric cylindrical opening extending from one end about ¾ of the length of the block was the heating source for the distillate apparatus. A resistance heating jacket was wrapped around a portion of the block not having the central opening therein. The distillation flask was a test tube closed at the top having a side takeoff arm for the distillate removal. The block is of course positioned with the central opening up for use. The central opening in the aluminum block is not much larger than the outer diameter of the flask so the block heating surface fits quite closely around the flask. A slot was cut lengthwise along one side of the aluminum block beginning at the end having the opening to accommodate the takeoff arm of the flask and allow the flask to be seated well down in the opening of the block.

The vacuum distillation of the sample is carried out over a period of 1 hour at a pot temperature of about 138° C. and a head temperature of about 120° C. determined by measurements in the block at appropriate points and using 0.1–0.2 mm. of Hg pressure. Continuing the description of the biphenyl irradiation, a 0.4705 gram sample of the 58.0 gram of irradiated biphenyl described above was weighed into the distillation flask. The residue left after distillation of the sample as described above was 0.0799 gram or 17.0% by weight. Using a blank of 1.2% of residue determined by distilling unirradiated biphenyl in a similar manner, the net amount of residue due to radiation was 15.8% by weight.

In a similar manner to that described above, other experiments were run with biphenyl and biphenyl plus stabilizers. The results of these runs are reported in the table below.

| Stabilizer | Weight percent Stabilizer | Mol. percent Stabilizer | Weight percent Blank | Weight percent Residue [2] | Percent Res. Reduction | Stabilization Index |
|---|---|---|---|---|---|---|
| Biphenyl Control | | | 0.0 | 16.1 | | |
| Sulfur | 0.2 | 0.8 | [1] 0.2 | 14.2 | 11.8 | 14.8 |
| Do | 2.5 | 11.0 | 2.3 | 7.5 | 53.4 | 4.9 |
| Sulfur plus Tetramethyl-thiuramdisulfide | 1.7 | 7.7 | 3.3 | 8.7 | 46.0 | 6.0 |
|  | 1.7 | 1.0 | | | | |
| β-Naphthiol | 5.0 | 4.8 | 0.7 | 15.7 | 2.5 | 0.5 |
| Diphenyl-selenide | 5.0 | 3.4 | 0.0 | 22.2 | 0.0 | 0.0 |

[1] This blank represents a calculated blank, not a measured one.
[2] This column is corrected to residue due to radiation by subtracting blank.

In the table above the weight and mol percent stabilizer are calculated on the basis of the mixture of biphenyl and the stabilizer. The third column is either a determined or calculated value of the residue of unirradiated samples, only one value being a calculated value as indicated. For the percent residue reduction due to stabilization the basis was the biphenyl control run which was the average of two biphenyl radiation experiments and one blank run. Stabilization index is the ratio of percent residue reduction/mol percent stabilizer.

Upon examining the data of the table it can be noted that neither β-naphthiol nor diphenylselenide is effective as a stabilizer and the diphenylselenide even catalyzes residue formation appreciably. The apparent reduction in residue with the β-naphthiol stabilizer is not significant in view of the high mol percent stabilizer used. It appears that the efficiency of the sulfur as a stabilizer is dropping off at 11.0 mol percent as indicated by the stabilization index as compared to the 0.8 mol percent sulfur experiment. It was thought that possibly this might be due to the formation of sulfur polymers such as the relatively stable $S_8$ ring and that a polysulfide compound such as tetramethylthiuramidisulfide might disperse the sulfur and make it more active; however, the results indicate that the polysulfide accomplished nothing and the residue reduction is what would be expected from the free sulfur alone. It is likely that sulfur utilization would be improved in actual use of the coolant in a power reactor wherein operating temperatures may be 400° C. or higher since sulfur polymers would tend to deploymerize at such temperatures.

*Use of Biphenyl Containing 11 Mol Percent Free Sulfur as a Moderator and Coolant in a Power Reactor*

A typical power reactor is illustrated diagrammatically in the flow sheet shown in the accompanying drawing:

In the drawing, numeral 10 indicates a cylindrical reactor shell constructed preferably of steel. Within the shell is arranged a reactor core 11, which consists of plates of enriched uranium of such number, size, shape and composition as to be capable of becoming critical upon the addition of the sulfur-stabilized biphenyl. Surrounding the cylindrical shell 10 is a cylindrical reflector shell 12, which is also constructed of steel and which contains liquid reflector material. In the reactor core are inserted the usual control systems, indicated by numerals 52 and 53, the construction of which and use thereof is described in the Fermi et al. patent, referred to hereinabove.

Numeral 13 indicates a disengager or gas trap, which is merely a device for separating gas from liquid. The disengager is connected with the reactor shell 10 by pipe 14. The gas which is separated from the liquid coolant in 13 flows out by means of pipe 15, connected to pressure controller 16, which in turn is connected to condenser 17 by pipe line 18. Condenser 17 carries a discharge line or vent 19, permitting the discharge of gases to the atmosphere.

Liquid coolant flows from disengager 13 through line 20 into pump 21 by means of which the coolant is circulated into and through heat exchanger or boiler 22 via line 23. Leaving heat exchanger 22 by pipe 24 the coolant, now reduced in temperature, is returned to reactor shell 10 by line 24. Branch lines 25 carry the coolant into reflector shell 12 and thence by pipe 26 back into the main stream flowing into pipe 14.

Pipe line 27 carries a small stream of coolant from pipe 24 either into filter 28 via pipe 29, thence returning the flow of filtrate by pipe 30 to the main stream flowing in pipe 24, or by means of pipes 31 and 32 into purification still 33. Heating coil in the reboiler section of still 33 provides the necessary heat for distillation, the liquid returning thence to pipe 24 by means of pipe 35.

Liquid coolant which is fed to still 33 flows through pipe 32 and enters the still first passing pressure reducing valve 36, by which means the flow is controlled to that required to keep the high boiling components at the desired level. Still 33 may operate at reduced or atmospheric pressure. The distillate in vapor form leaves the still by pipe 37 entering condenser 17, where the vapors are liquefied, the liquid resulting therefrom flowing through pipe 38 into pump 39 and being thereby returned to pipe 40 to the main stream flowing in pipe 20. Makeup liquid coolant is introduced into tank 41 and flows by pipe 42 into pipe 38 and thence into pump 39. Additional sulfur to make up for that removed as residue in still 33 can also be added from tank 41.

Purification still 33 may be operated continuously or intermittently as desired. It is, of course, desirable to keep the high boiling decomposition products in the circulating liquid as low as possible in view of the adverse effects of these products on viscosity and heat transfer. Small amounts of such high boiling decomposition products usually in the neighborhood of 5–10% by weight of the liquid can be tolerated without a substantial decrease in the heat transfer coefficient. After the high boiler content has reached a predetermined value (as determined by distillation of the sample), the purification still is placed in operation and a constant stream of coolant withdrawn from the system into the still 33 where it is distilled. The distillate passes into condenser 17, where it is condensed and then returned to the system by means of pump 39 as above described. The high boilers are removed from still 33 by means of pipe 45 containing valve 46 and thenceforth discarded.

Heat energy is withdrawn from the liquid coolant circulating in the heat exchanger or boiler 22 in any manner desired. In one method of operation, boiler feed water is introduced by means of pipe 50 and steam generated under pressure within boiler 22 being withdrawn at pipe 51 and supplied to a steam turbine or other prime mover. The condensate produced in the conventional condenser forming part of the prime mover will again be returned to the boiler. It is, of course not necessary that water be used, since any suitable thermally stable organic liquid may serve the same purpose and obviate the hazards encountered with accidental leakage of water into the coolant-moderator system. The further utilization of the energy obtained in this manner from a nuclear reactor is well known to those skilled in the art and forms no part of the present invention.

The system is filled with an inert gas such as nitrogen or helium, so as to eliminate traces of air and moisture pending the introduction of the stabilized biphenyl charge. The system is now loaded with the stabilized biphenyl by introduction to supply tank 41, from which point it is permitted to flow into and through the pipe lines and various pieces of equipment completely filling the same with the exception of still 33 and condenser 17 which are not filled. The system is filled to the point where the disengager is approximately one half full. Pump 21 is activated, the control devices in the reactor adjusted to release power in such an amount as to raise the temperature of the stabilized biphenyl in the system to a temperature in the range of about 100° to about 250° C., preferably between about 130° and 200° C.; however, it is possible higher temperatures will be desirable. Heat is extracted from the heat exchanger or boiler in the manner described above.

Radiolytic damage to the fluid is evidenced by the accumulation of fixed gases in disengager 13 and also by the formation of high boiling hydrocarbons in the liquid. The fixed gases consist of a mixture of hydrogen and hydrocarbons with the former predominating. As the amount of fixed gas increases in the closed system, the pressure rises to the desired value, after which it is continuously or intermittently withdrawn through pressure control valve 16. Withdrawal of gas is controlled at such a rate so as to maintain the system under a pressure which is sufficiently high so as to minimize vapor formation in the hottest part of the system. This hottest part of the system is adjacent to the fuel elements in reactor 11. Decrease of density occurring as a result of increase in temperature will result in some loss of moderation by reason of the fewer hydrogen atoms per unit volume of coolant. Such decrease in moderation will, to some extent, damp out the nuclear reaction and can be compensated by adjustment of control devices. At all events, it is necessary to maintain the gas pressure on the system sufficiently high so that vapor formation will not occur.

The discharge of fixed gases attending the maintenance and the regulation of pressure upon the system will carry out some biphenyl in vapor form. In order to recover such biphenyl the gases are discharged into condenser 17, wherein they are cooled by contact with cooled surfaces maintained at a low temperature by means of cooling water. Condensed liquid biphenyl will be returned by pipe to 38, the valve therein now being opened into the suction side of pump 39 and thence returned to the circulating system.

The high boiling tar-like material formed concomitantly with the gases by the effect of radiation should also be removed or maintained at a desirably low level. This is done by the withdrawal via lines 27, 31 and 32 and reducing valve 36 of a constant stream of liquid flowing to still 33. Still 33 operates under reduced or atmospheric pressure as a result of which the contents can be boiled by means of a side stream of fluid passing to heating coil 34, located within the reboiling zone of still 33. The distillate leaving the still passes by line 37 also into condenser 17. The condensate is mixed with that derived from the disengager discharger vapors and is then returned by pump 39 to the system.

Removal of solid particles from the interior walls of the system which become suspended in and carried by the circulating liquid is best done by the provision of a filter 28 located in the system as shown in the drawing. Such filter is supplied by lines 29 and the filtrate returned by line 30 again to the system. The pressure drop across the filter may be overcome by means of a suitable pump installed in either of these lines. By this means the induced radioactivity in the suspended foreign materials in the circulating fluid can be maintained at a low value.

It is evident from the experimental data and the description of the reactor system that the stabilized organic coolants and moderators are extremely valuable. In the table of data it is indicated that more than 50% residue reduction can be accomplished in biphenyl using free sulfur as a stabilizer. This, of course, means that the amount of makeup coolant and/or moderator required to be added to the reactor system is reduced at least 50%, which also represents at least a 50% reduction in cost. Organic coolants and modifiers are expensive and this substantial savings can make the difference between commercial use or not. Also with much less residue being formed less workup and handling of materials is required, and a more stable operating system results due to less density and viscosity changes. Residues formed in the system tend to coat heat exchange surfaces reducing the effectiveness thereof and necessitating periodic cleaning, and obviously with substantially reduced formation this problem will be very much reduced. Thus it is seen that the stabilized reactor coolants and/or moderators of the invention have some very important advantages over the unstabilized coolants and moderators.

Instead of the sulfur-stabilized biphenyl used in the power reactor system described above any of the other sulfur-stabilized polyphenyls of the invention or mixtures thereof can be used. Free sulfur is the stabilizer, so sulfur compounds which break down under conditions of use yielding free sulfur in sufficient quantity would be equivalent to the use of free sulfur itself. It would be expected that a polysulfide would yield free sulfur, but the particular polysulfide tested did not. It is possible that under conditions of higher temperature such as would be used in actual power systems polysulfides might yield free sulfur in sufficient amount to act as the stabilizer for the polyphenyl. Also free selenium would be expected to be effective stabilizers in view of the effectiveness of free sulfur in which case it would be to a degree equivalent to free sulfur; however, free sulfur is the preferred stabilizer.

Although the invention has been described in terms of specified apparatus and materials which are set forth in considerable detail, it should be understood that this is by way of illustration only and that the invention is not necessarily limited thereto, since alternative embodiments and operating techniques will become apparent to those skilled in the art in view of the disclosure. For example, the polyphenyls can contain non-interferring substituent groups, which do not substantially interfere with or can to a degree promote the sulfur stabilization. Accordingly, modifications are contemplated which can be made without departing from the spirit of the described invention.

This application is a continuation-in-part of copending application Serial No. 790,603, filed February 2, 1959, now abandoned.

What is claimed is:

1. A neutronic power reactor in which the coolant for the fuel elements comprises a major amount of polyphenyl, and at least a sufficient amount of free sulfur to inhibit the formation of residue from said polyphenyl but not more than 30 mol percent based on said polyphenyl.

2. The reactor of claim 1, wherein said polyphenyl comprises biphenyl.

3. The reactor of claim 1, wherein said polyphenyl comprises a terphenyl.

4. The reactor of claim 1, wherein said polyphenyl comprises an isopropylterphenyl.

5. The reactor of claim 1, wherein said polyphenyl comprises a t-butylterphenyl.

6. The reactor of claim 1, wherein said polyphenyl comprises a mixture of mono- and di-t-butylated o-, m- and p-terphenyls having not more than about 50% by weight of t-butylated p-terphenyl isomer.

7. A neutronic power reactor in which the neutron moderator comprises a major amount of polyphenyl, and at least a sufficient amount of free sulfur to inhibit the formation of residue from said polyphenyl but not more than 30 mol percent based on said polyphenyl.

8. The reactor of claim 7, wherein said moderator comprises biphenyl.

9. A neutronic power reactor in which the neutron moderator and the coolant for the fuel elements comprises a major amount of polyphenyl, and at least a sufficient amount of free sulfur to inhibit the formation of residue from said polyphenyl but not more than 30 mol percent based on said polyphenyl.

10. The reactor of claim 9, wherein said moderator and coolants comprises biphenyl.

11. A radiation stabilized composition comprising a major amount of polyphenyl, and at least a sufficient amount of free sulfur to inhibit the formation of residue when said polyphenyl is irradiated but not more than 30 mol percent based on said polyphenyl.

12. The composition of claim 11, wherein said polyphenyl is biphenyl.

References Cited in the file of this patent

UNITED STATES PATENTS 2,883,331   Bolt et al. _____ Apr. 21, 1958